United States Patent [19]

Dunn et al.

[11] Patent Number: 4,904,050
[45] Date of Patent: Feb. 27, 1990

[54] METHODS OF AND SYSTEMS FOR OPTICAL FIBER SENSING

[75] Inventors: Lawrence R. Dunn, Flowery Branch; Ian A. White, Roswell; Willard C. White, III, Doraville, all of Ga.

[73] Assignee: American Telephone and Telegraph Company, AT&T Bell laboratories, Murray Hill, N.J.

[21] Appl. No.: 238,810

[22] Filed: Aug. 31, 1988

[51] Int. Cl.$^4$ .................................................. G02B 6/00
[52] U.S. Cl. .................................. 350/96.29; 250/227
[58] Field of Search ........................... 350/96.15, 96.29; 250/227

[56] References Cited

U.S. PATENT DOCUMENTS 4,399,430  8/1983  Kitchen .............................. 340/550
4,775,214 10/1988  Johnson ............................. 350/96.29
4,775,216 10/1988  Layton .............................. 350/96.29

OTHER PUBLICATIONS

Article entitled "Integrated Communication and Sensing System Using One Single Mode Optical Fiber", vol. 24, No. 13 of Electronic Letters, 6/23/88.
Article entitled "Use of Fiber for Security", Jun. 1988 issue of Lightwave Magazine.

Primary Examiner—Frank Gonzalez
Attorney, Agent, or Firm—Edward W. Somers

[57] ABSTRACT

An optical fiber sensing system for detecting intrusion of optical fiber or optical fiber cables includes an interferometric arrangement. Two ports (28, 30) of a four port splitter (25) are connected to a source (26) of optical power such as a laser, for example, and to a detector (32). The other two ports (46, 48) are connected to ends of a length (50) of monitoring optical fiber. An input signal to the splitter is split with one subsignal being directed in one direction around the length of optical fiber which serves as a common path between the two ports. The other signal is caused to travel around the common path in an opposite direction. The split signals are recombined in the splitter and their phase difference measured as a detectable pattern by the detector. Should there be intrusion of the optical fiber or a cable containing the monitoring optical fiber, the pattern which is detected will change a significant amount.

23 Claims, 2 Drawing Sheets

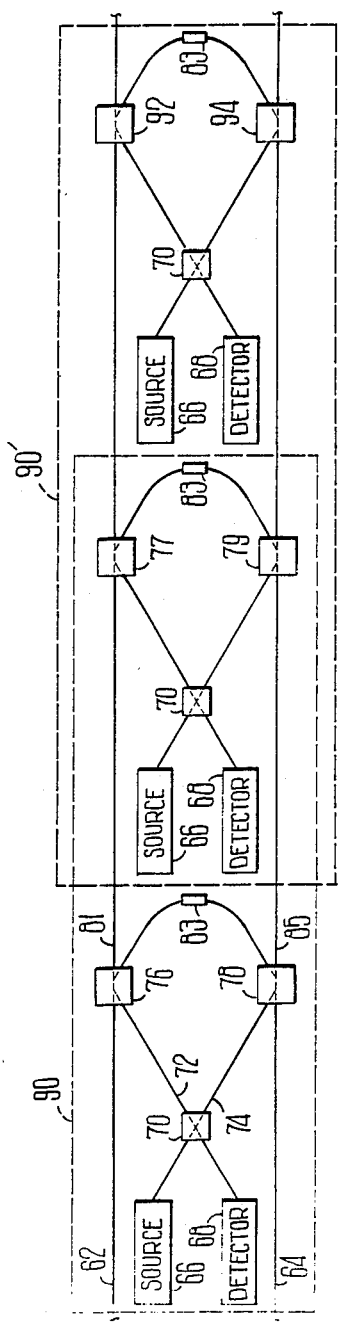

METHODS OF AND SYSTEMS FOR OPTICAL FIBER SENSING

TECHNICAL FIELD

This invention relates to methods of and systems for optical fiber sensing. More particularly, it relates to a sensing system which is used to detect intrusion into or upon an optical fiber network.

BACKGROUND OF THE INVENTION

Until somewhat recently, optical fiber transmission systems were believed to be secure from intrusion. However, it is now known that a signal can be tapped from any length of optical fiber. A first step is for an intruder to remove portions of a cable sheath system and expose the optical fiber. Then some of the light transmitted through an optical fiber core is deflected to a receiver of the intruder. The extent to which signals in an unprotected optical fiber system can be detected depends on the intrinsic noise of the intruding receiver.

Now that it is known that optical fiber transmission systems are not so immune, there is a need to determine if and when intrusion occurs. In other words, a monitoring system is needed to provide an indication of the intrusion of optical fiber systems. Experts in the field have said that access to the optical fiber cables is not difficult and that there are few good ways of detecting intrusion unless the activity inside the fiber can be monitored.

Such monitoring or sensing systems are needed in an optical fiber system wherein sensitive information is transmitted. Aside from the obvious need to detect intrusion into optical fiber systems used in the military establishment, there also is such a need in civilian commercial enterprises such as in banking, for example.

Banking is one line of commerce where security against intrusion is needed as streams of financial data flow along an increasing number of optical fiber networks. Bank customers expect confidentiality and banks themselves need information control to compete. At the wholesale level where the largest money transactions take place, fiber tapping is not perceived to be a significant threat at this time. However, the movement of large sums of money in commerce obviously requires a high degree of security.

In an attempt to provide suitable security, the Federal Reserve System has evinced a desire to encrypt its telecommunications network by using data codes. A problem with encryption is how to manage safely the access to keys that unlock the data codes.

As for voice encryption, several problems are posed. One is the difficulty of preserving voice recognition once the message has been decoded. The other is the cost involved in providing individual encryption devices for each user. Furthermore, after a spy scandal surfaced recently, encryption no longer has been considered as the best protection for classified voice and data transmission.

The prior art includes systems intended to address the problem of security in optical fiber transmission systems. To protect cable, some advise installing the cable in a conduit and running a current along the conduit. An ohmmeter would detect any intrusion into the conduit. In a more sophisticated arrangement, a cable-tapping device draws off power through a microbend in the cable. The tapped power is run through a computer programmed to recognized disparities and sound an alarm and describe by way of a computer-screen menu the location of the intrusion. For such a system, the present cost is reported to be about $1000. per link.

Optical fiber can be used to detect a tap by means of optical fiber power loss that can be monitored by an optical time domain reflectometer or a sensitive photo detector. Typically, the prior art solutions have taken the course of monitoring the optical power transmission through each optical fiber. Should an optical fiber transmission system be intruded, an optical signal is tapped and optical power is extracted from the line. At the ends of the transmission line, detectors look for a change in optical power. If such a change is sensed, an alarm is set off. In such an arrangement, each optical fiber has to be monitored to be secured. Obviously, this solution is an expensive one.

More recently, in an article appearing in Volume 24, No. 13 of *Electronics Letters* dated June 23, 1988 and entitled "Integrated Communication and Sensing System Using One Single Mode Optical Fiber", the author discloses the use of an interferometric sensing technique to detect intrusion. This interferometric sensing technique utilizes the interference between different bound modes of an optical fiber that travel in the same direction along a fiber path, commonly referred to as a speckle pattern. However, to use this technique for single mode fiber systems where only one mode type exists, an additional wavelength, which is referred to as a monitoring wavelength and which is in the wavelength range of multimode operation of the fiber, must be introduced into the fiber path. This monitoring wavelength then launches more than one mode into the fiber. The consequent changes in speckle pattern which reflect changes in the phase relationship between these modes can be monitored. Whenever the optical fiber is touched, for example, that speckle pattern changes. A detector is positioned to be spaced from an end of the converted single mode fiber. When the special optical fiber is touched, the speckle pattern is displaced from the zone of pick up of the detector. In other words, the detector position can be varied to alter the degree of sensitivity.

Although this last described arrangement avoids the necessity for associating a monitor with each optical fiber in a cable, it does have certain drawbacks. For example, the monitoring wavelength that is used must be one at which the optical fiber operates multimode. This means that a relatively short wavelength must be used. However, as is well known, the loss in an optical fiber increases rapidly as the operating wavelength decreases because of Rayleigh scattering. For example, at a wavelength of 0.63 micron, the loss in the optical fiber is approximately eight to ten times as much as the loss at an operating wavelength of 1300 nanometers. As a result, this system cannot be used as a system other than one including a relatively short length of optical fiber. In fact, in the above-identified article appearing in *Electronics Letters*, mention is made that the system can work at distances out to several kilometers. Also, the last described arrangement is not as stable as desired inasmuch as the optical fiber can be moved relative to the detector. As a result, it is subject to vibrations, and false alarms of security violations may occur.

It should be clear that what is needed and what is not yet available is an optical fiber sensing system which is low in cost and which may be used to provide security for both voice and data transmission. What is desired is a system which does not need to be associated with each optical fiber in a cable. Hopefully, such a sought-after system would enjoy a wide spectrum of applicability in providing security in a number of environments.

Summary of the Invention

The foregoing problems of the prior art have been overcome by the optical fiber sensing system of this invention. An optical fiber sensing system includes an optical splitter for splitting an incoming signal into two subsignals. The optical fiber sensing system includes an optical fiber path which begins and ends at the splitter for receiving subsignals which are split from an incoming signal. The path is a common path for the split signals. The splitter causes the subsignals to be sent in opposite directions along the common path which begins and ends at the splitter. Also, the splitter is effective to recombine the subsignals after the subsignals have travelled in opposite directions around the common path. The recombined subsignals are manifested in a pattern which is characterized according to interferometric interaction among the subsignals as they travel along the common path.

A source, which may have a relatively high degree of coherence is connected to the splitter and provides an incoming optical signal to the splitter. Detecting facilities also are connected to the splitter and detect the optical power level of the two interfering subsignals.

BRIEF DESCRIPTION OF THE DRAWING

Other objects and features of the present invention will be more readily understood from the following detailed description of specific embodiments thereof when read in conjunction with the accompanying drawings, in which:

FIG. 3 is a schematic of another arrangement of the preferred embodiment of FIG. 2.

DETAILED DESCRIPTION

Figure 1:
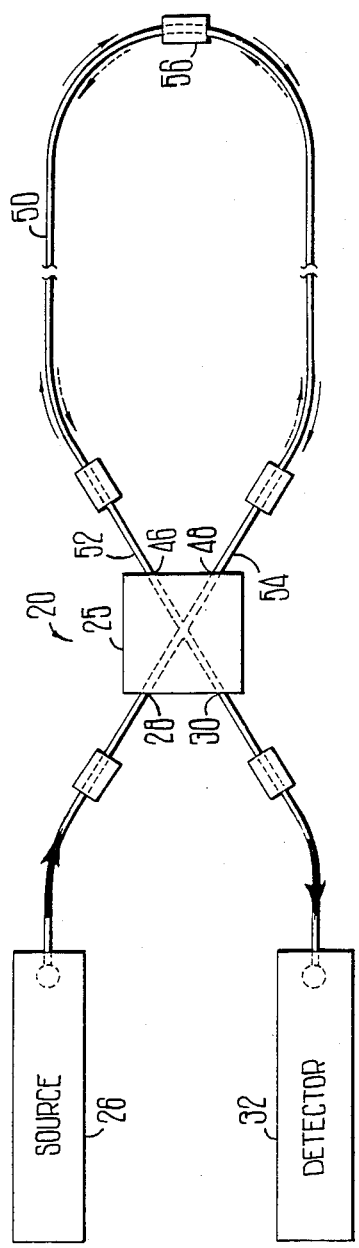
FIG. 1 is a schematic view of an optical fiber sensing system of this invention.

Referring now to FIG. 1, there is depicted a schematic view of an optical fiber sensing system which is designated generally by the numeral 20. The system 20 includes a four port splitter 25 which is readily available commercially and which also may be referred to as a coupler. It may, for example, comprise a fused biconic tapered splitter which is available from the Gould, Inc. having an office at Glen Burnie, Md.

A source 26 of optical power is connected to a port 28 of the optical splitter 25. The source of power which may be one having a relatively high degree of coherence provides an optical signal to the splitter 25. The narrower the range of operating wavelengths, the more sensitive the system 20.

Although a laser is preferred as the source 26, other sources of optical power may be used. For example, a light-emitting diode also could be used to provide successive signals for the optical system.

Connected to a second port 30 of the splitter 25 is a detector 32. The detector 32 is adapted to detect changes on the interferometric pattern of the system 20 when the optical fiber is handled.

As mentioned hereinbefore, the optical splitter 25 includes four ports. In addition to one of the ports, the port 28, which is connected to the optical source 26 and the port 30 which is connected to the detector 32, the splitter also includes third and fourth ports 46 and 48, respectively. A length 50 of optical fiber has one of its ends, which is designated 52, is connected to the third port 46 and its other end 54 connected to the fourth port 48. The length 50 of optical fiber may comprise two optical fibers of a cable, for example, which are connected through a connector 56, or it may comprise a single length of optical fiber.

An incoming signal to the optical splitter 25 which is provided by the source 26 is split into two subsignals which are directed in different directions along a common path, which is provided by the length 50 of optical fiber. The paths of the subsignals are reconnected at far ends of the paths at the splitter 25. The split signals travel in opposite directions along the common path and are recombined back at the splitter with associated constructive or destructive interference. The constructive or destructive interference is registered as a power change at the detector 32 which is attached to the port 30 of the splitter.

The split as between the subsignals may be varied. A fifty-fifty split provides the most sensitive system wherein the interference ranges from 0 to 100%. A different split could be used if noise is a concern. Of course, should noise be a factor, detection facilities can be set at a higher level.

Any stress imparted to the length 50 of optical fiber or any change in the optical path that varies with time will change the phase relationship between the two oppositely travelling signals, thereby changing the interference between the two and registering a power change. Overall, in the handling of one cable, for example, signal level changes of about 1-2 dB or more with typical responses of about 2-3 dB have been observed. Such a sensitive response has a significant application in the detection of an intrusion attempt on to the optical fiber. In fact, the magnitude of the signal changes due to cable handling alone are sufficient to alert the system before any signal tapping occurs. Handling of bare fiber or a bundle of fibers which includes the sensing fiber results in large responses, on the order of about 10 dB. Also, acoustic vibrations established by normal voice patterns are manifested as disturbances on the order of a 1 to 2 dB level because of the acute sensitivity of the optical fiber.

Such a system can be included easily in an existing optical fiber transmission system provided there are two spare optical fibers that can be used to form the common path loop. If there is a differential change in stress with time, the phase relationship between the transmitted beams is changed and constructive or destructive interference occurs which changes significantly the detected signal. Such stress may occur in any handling of the cable or fiber. In this system, no additional loss of the system need be induced in order to create a change. Advantageously, the system 20 is a distributed sensor that can be used to monitor an entire cable length between regenerators.

For the source 26 of optical power, a laser is preferred because of its single wavelength. With a single wavelength, intrusion causes the interference pattern to change from constructive to destructive, resulting in a significant dB loss. On the other hand, for a light-emitting diode, there is a wide range of wavelengths. Intrusion may cause a change of only about 10 percent in the interference pattern, that is about 0.5 dB, so that the intrusion is not as noticeable.

The optical fiber sensing system of this invention has several important advantages over those of the prior art. First, the sensitivity is such that such a system need not be associated with each optical fiber in a cable. One fiber in a cable is sufficient for this purpose and will provide an alarm. In fact, the arrangement is so sensitive that a mere touching of the cable stresses the sensing fiber sufficiently to provide an alarm signal.

Secondly, the optical fiber sensing system has been shown to perform as intended over relatively long distances. For example, a sixty kilometer loop extends protection over a distance of thirty kilometers. Or, a sixty kilometer span may be protected by two, thirty kilometer loops, one beginning from each end of the distance span. This is an example distance and is not a limitation of the system. A longer wavelength in which losses are lower could be used and thereby transmit over greater distances. For example, the transmission length can be doubled by increasing the wavelength from 1300 to 1550 nanometers.

As mentioned hereinbefore, such a system as that described can be included easily in an existing optical fiber transmission system provided there are two optical fiber spares that be used to form the loop. As for a new installation, two optical fibers in a cable are designated to serve as the loop. There may be instances however, when two fibers for sensing or monitoring use are not available. In those instances, wavelength division multiplexing (hereinafter "W.D.M.") techniques are used to provide a signal on an optical fiber that also is carrying normal traffic signals.

Figure 2:
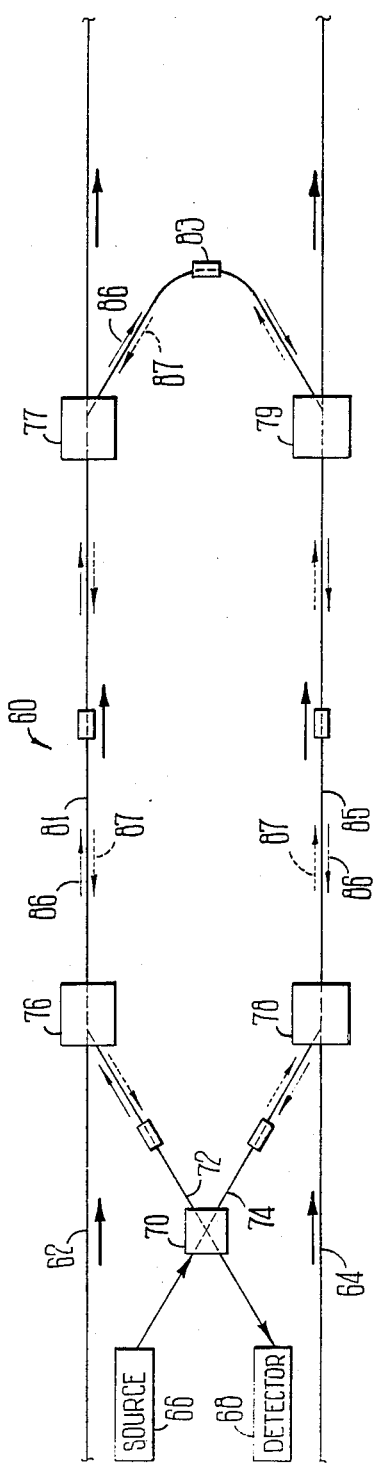
FIG. 2 is a schematic of a preferred embodiment of an optical sensing arrangement of this invention.

A system which uses W.D.M. techniques is depicted, for example, in FIG. 2 and is designated generally by the numeral 60. As is shown, the system 60 includes two normal traffic-carrying optical fibers 62 and 64. For detection of of intrusion, the system 60 includes a source 66 and a detector 68, each of which is connected to a splitter 70 such as that used in the arrangement of FIG. 1.

The splitter 70 splits an optical signal incoming from the source 66 into two subsignals with one of the subsignals travelling initially along a loop portion 72 and another travelling initially a loop portion 74. Required in this arrangement are additional splitters, more particularly W.D.M. splitters 76, 77, 78 and 79. These W.D.M. splitters may be fused biconic tapered splitters which also are available from Gould, Inc. The signal which is split and sent in opposite directions along the portions of the intrusion detection loop is different from those signals used to carry normal traffic. Only those signals in a narrow band of operating wavelengths are split.

One split signal which is directed in a clockwise direction first through the W.D.M. splitter 76, then along a loop portion 81 and through the W.D.M. splitter 77, travels through a connector 83 and then through the W.D.M. splitter 79, a loop portion 85 and through the W.D.M. splitter 78 returning to the splitter 70 to be recombined. This signal is indicated in FIG. 2 by solid arrows 86—86. There, it is recombined with the split signal which had been directed in a counterclockwise direction as viewed in FIG. 2 sequentially through the W.D.M. splitters 78, 79, 77 and 76 and which is indicated in FIG. 2 by broken arrows 87—87.

The obvious advantage of this arrangement is that it does not require additional optical fibers over those which already carry traffic. As the intrusion detection system does not carry high bit rates, and because low bit rate detectors can detect signals down to a value less than −60 dBm, the total loss of the system around the loop could be 40–45 dB without loss of sensitivity.

The arrangement depicted in FIG. 2 also may be used as a module 90 for extending the intrusion protection along an entire network length. For example, in FIG. 3 is shown the system of FIG. 2 with each pair of W.D.M. splitters such as 76 and 78 for example being connected to a source and a detector but also to an optical fiber connector to close a loop. As a result, a plurality of modules are formed along the network length, each module comprising a source 66, a detector 68 and four W.D.M. splitters closed in a loop by a connector such as that designated 83 in FIG. 2. In a next successive module, that is one which is designated 90' in FIG. 3, the W.D.M. splitters 77 and 79 of the module 90 function as the splitters 76 and 78 for the module 90 and splitters 92 and 94 function for the module 90' as the splitters 77 and 79 do for the module 90. Then in the next successive module, the W.D.M. splitters 92 and 94 become the splitters which are adjacent to the source and to the detector of that module. Isolation of the individual modules can be achieved by using different frequency modulations in the sources of adjacent loops and by using electrical filters that are narrow pass band filters around the entire frequency.

Sensitivity of the inventive systems can be changed by the modulation rate of the source which changes the spectral characteristics of the pulses and in so doing can exaggerate the constructive and destructive interference. Also, change in the splitting ratio of the four port splitter as indicated earlier on herein can be used.

The evanescent or fused tapered splitter such as the splitter 25 described hereinbefore may not be preferred for multimode optical fiber systems. This may become important when attempting to retrofit existing optical fiber systems, of which many are multimode such as, for example, in data links, with a sensing system of this invention.

With single mode transmission, each successive signal input into the splitter is split over into a subsignal of the same mode in each of two coupling fibers which are fused together side by side and which comprise the splitter. In other words the splitter distributes equally the mode volume. Upon the return of the subsignals after having traversed a common path, but in opposite directions, intrusion is detected by the observation of a phase difference in the returning signals.

In multimode however, the amount of coupling from one optical fiber to another in a fused tapered splitter depends on the closeness of the optical fiber cores and how the field varies across the cross section of the optical fibers comprising the splitter. Should one mode be confined tightly to a fiber, there will be little coupling to the adjacent fiber of the splitter. On the other hand, least bound modes will spread out and couple easily across the two adjacent fibers. As a result, signals of one mode may leave the port 46 (see FIG. 1) and signals of another mode leave the port 48. When these signals are returned to the splitter, there may be little, if any, interference pattern because in effect they have travelled over significantly different paths within the common path.

As a solution to this problem in a multimode system, a discrete element splitter such as a half silvered mirror is used. Also, the splitter may be a cylindrical graded index lens, commonly referred to as a GRIN rod lens. Such a splitter reflects half the power input and transmits the other half. In other words, half the power over the entire mode distribution is reflected and half is transmitted, so that similar fields occur in opposite directions around the common path. Inasmuch as there exists substantially the same mode distribution in opposite directions, increased interference is expected as a result of intrusion.

Many uses for the optical fiber sensing systems of this invention can be envisioned. For example, a dry splice could be located in each closure so that water intrusion into the closure and hence in a gap between optical fiber ends would cause a change in the index of refraction in the gap and hence cause a change in the interferometric pattern. Also, such a system can be used in a number of security applications. For example, in the home, such a system could be deployed about each window and door or embedded in carpets or in carpet padding. Pressure on the carpeting, for example, would result in an alarm. In such applications, the relatively short distances involved would require only low grade optical fiber and splitters as well as relatively inexpensive sources and detectors. Another variant would have the desired sensing system deployed around the perimeter of a house or a military installation embedded under turf or strung along a fence. This could be accomplished in such a manner that the physical arrangement is invisible to visual inspection of the premises. Such a system also could be routed aside pipelines, for example, to detect physical intrusion thereof.

It is to be understood that the above-described arrangements are simply illustrative of the invention. Other arrangements may be devised by those skilled in the art which will embody the principles of the invention and fall within the spirt and scope thereof.

We claim:

1. An optical fiber sensing system, which comprises:
    source means for providing successive optical signals;
    optical splitter means connected to said source means for splitting each successive optical signal into a set of two subsignals and for providing said subsignals as outputs, said splitter means also being effective to recombine each said set of subsignals after each said set of subsignals have travelled in opposite directions around a common path;
    an optical fiber path which begins and ends at said optical splitter means for receiving each said set of subsignals which have been split from an incoming signal from said source and which provides a common path for carrying said subsignals in opposite directions therealong and for returning said subsignals to said splitter means where they are recombined; and
    detector means for detecting changes in an optical transmission characteristic between successive sets of subsignals which are returned to said splitter means.

2. The optical fiber sensing system of claim 1, wherein said source means comprises a coherent light source.

3. The optical fiber sensing system of claim 2, wherein said source means comprises a laser.

4. The optical fiber sensing system of claim 1, wherein said source means comprises a light-emitting diode.

5. The optical fiber sensing system of claim 1, wherein said optical fiber path comprises optical fibers which are disposed in a cable.

6. The optical fiber sensing system of claim 5, wherein said optical fibers which comprise said optical fiber path are dedicated to said optical fiber sensing system.

7. The optical fiber sensing system of claim 5, wherein said optical fibers which provide said path also optical communications signals which differ in wavelength from those used in said sensing system.

8. The optical fiber sensing system of claim 1, which is used in a single mode transmission system and wherein said optical splitter means comprises a fused biconic tapered splitter.

9. The optical fiber sensing system of claim 1, which is used in a multimode transmission system and wherein said optical splitter means comprises a discrete element beam splitter.

10. An optical fiber sensing system, which comprises:
    a first optical fiber which carries routinely communications traffic signals;
    a second optical fiber which carries routinely communications traffic signals;
    a pair of wavelength division multiplexer splitters which are spaced along said first optical fiber;
    a pair of wavelength division multiplexer splitters which are spaced along said second optical fiber;
    a source of optical power which is adapted to provide signals of a wavelength which differs from the wavelengths of those communication traffic signals which are carried routinely on said first and second optical fibers;
    an optical fiber splitter which is connected to one of the wavelength division multiplexer splitters along said first optical fiber, to one of said wavelength division multiplexers along said second optical fiber, and to said source of optical power, said optical fiber splitter being effective to receive incoming signals from said source to split each incoming signal into two subsignals which are provided as outputs and which have a phase relationship;
    means for connecting the other wavelength division multiplexer splitter along the first optical fiber to the other wavelength division multiplexer along the second optical fiber to provide a loop which includes said optical fiber splitter, said wavelength division multiplexer splitters and portions of said first and second optical fibers, said loop being effective to receive said subsignals of each said signal and to provide a common path for said subsignals to be moved in opposite directions around said loop and return to said optical fiber splitter which is effective to recombine said subsignals; and
    a detector connected to said optical fiber splitter for detecting changes in the phase relationship between the two subsignals which are routed around said loop in opposite directions.

11. The optical fiber sensing system of claim 10, wherein said optical fiber splitter is a four port splitter.

12. The optical fiber sensing system of claim 10, wherein said source comprises a coherent light source.

13. The optical fiber sensing system of claim 12, where said source comprises a laser.

14. The optical fiber sensing system of claim 10, wherein said pair of wavelength division multiplexers along said first optical fiber is a first pair associated with said first optical fiber and said pair of wavelength division multiplexers along said second optical fiber is a first pair associated with said second optical fiber, and said optical fiber sensing system comprises a plurality of pairs of wavelength division multiplexers along said first optical fiber and a plurality of pairs of wavelength division multiplexers along said second optical fiber, each successive pair of wavelength division multiplexers along one of said optical fibers after said first pair therealong comprising a wavelength division multiplexer which is common to the preceding and to the succeeding pair.

15. The optical fiber sensing system of claim 14 wherein said connecting means comprises a connector with each wavelength division multiplexer along the first optical fiber being connected by one said connector to a wavelength division multiplexer of a corresponding pair along said second optical fiber.

16. The optical fiber sensing system of claim 10, wherein said portions of said first and second optical fibers include those portions of said first and second optical fibers disposed between said wavelength division multiplexers spaced along said first and second optical fibers.

17. The optical fiber sensing system of claim 10, wherein the changes in phase relationship are detected as changes in optical power.

18. A method of sensing disturbances of an optical fiber system, said method comprising the steps of:
  providing a source of optical signals;
  splitting each optical signal into two subsignals;
  directing the two subsignals in opposite directions around a common loop path and returning the two subsignals to entry points of said path;
  recombining the two subsignals after the two subsignals have moved about the common path and returned to the entry points; and
  detecting changes in the phase relationships as between successive pairs of the split subsignals to indicate a disturbance of the optical fiber system.

19. The method of claim 18, wherein said step of providing a source includes providing a source of optical power which comprises a coherent light source.

20. The method of claim 19, wherein said step of providing a source comprises providing a laser.

21. The method of claim 18, wherein said step of directing includes directing the split subsignals along optical fibers in a cable, said optical fibers being connected to provide the common path.

22. The method of claim 21, wherein said step of directing along optical fibers in a cable is accomplished so that said optical fibers in said cable do not carry transmission signals other than the subsignals received from the split optical signal.

23. A method of sensing disturbances of an optical fiber system, said method comprising the steps of:
  providing a first optical fiber which carries communications traffic signals;
  providing a second optical fiber which carries communications traffic signals;
  providing a pair of wavelength division multiplexers which are spaced along the first optical fiber;
  providing a pair of wavelength division multiplexers which are spaced along the second optical fiber;
  providing a source of optical signals;
  splitting each optical signal into two subsignals which have a phase relationship;
  establishing a common loop path for the two subsignals which includes that portion of the first optical fiber between the two wavelength division multiplexers which are spaced along the first optical fiber and that portion of the second optical fiber between the two wavelength division multiplexers which are spaced along the second optical fiber;
  directing the two subsignals in opposite directions around the common loop path;
  recombining each set of two subsignals after each set of two subsignals has moved in opposite directions around the common loop path; and
  detecting changes in the phase relationship as between successive sets of split subsignals to indicate disturbance of the optical fiber system.

* * * * *

REEXAMINATION CERTIFICATE (1761st)
United States Patent [19]

Dunn et al.

[11] B1 4,904,050

[45] Certificate Issued   Jul. 28, 1992

[54] METHODS OF AND SYSTEMS FOR OPTICAL FIBER SENSING

[75] Inventors: Lawrence R. Dunn, Flowery Branch; Ian A. White, Roswell; Willard C. White, III, Doraville, all of Ga.

[73] Assignees: Bell Telephone Laboratories, Incorporated, Murray Hill, N.J.; American Telephone and Telegraph Company, New York, N.Y.

Reexamination Request:
No. 90/002,355, May 24, 1991

Reexamination Certificate for:
Patent No.: 4,904,050
Issued: Feb. 27, 1990
Appl. No.: 238,810
Filed: Aug. 31, 1988

[51] Int. Cl.⁵ ............................ G02B 6/00; H01J 5/16
[52] U.S. Cl. ........................................ 385/12; 385/12; 250/227.19
[58] Field of Search ......................... 350/3, 12, 13, 27; 250/227.14, 227.15, 227.16, 227.17, 227.18, 227.19, 227.27; 356/73.1, 350

[56] References Cited

U.S. PATENT DOCUMENTS

| | | | |
|---|---|---|---|
| 4,299,490 | 11/1981 | Cahill | 356/350 |
| 4,342,907 | 2/1980 | Macedo et al. | 250/227 |
| 4,375,680 | 3/1983 | Cahill | 367/149 |

OTHER PUBLICATIONS

E. Hecht & A. Zajac, *Optics*, 4th printing Feb. 1979, Addison-Wesley Publishing Co. pp. 292, 323–324.

*Primary Examiner*—Frank Gonzalez

[57] ABSTRACT

An optical fiber sensing system for detecting intrusion of optical fiber or optical fiber cables includes an interferometric arrangement. Two ports (28, 30) of a four port splitter (25) are connected to a source (26) of optical power such as a laser, for example, and to a detector (32). The other two ports (46, 48) are connected to ends of a length (50) of monitoring optical fiber. An input signal to the splitter is split with one subsignal being directed in one direction around the length of optical fiber which serves as a common path between the two ports. The other signal is caused to travel around the common path in an opposite direction. The split signals are recombined in the splitter and their phase difference measured as a detectable pattern by the detector. Should there be intrusion of the optical fiber or a cable containing the monitoring optical fiber, the pattern which is detected will change a significant amount.

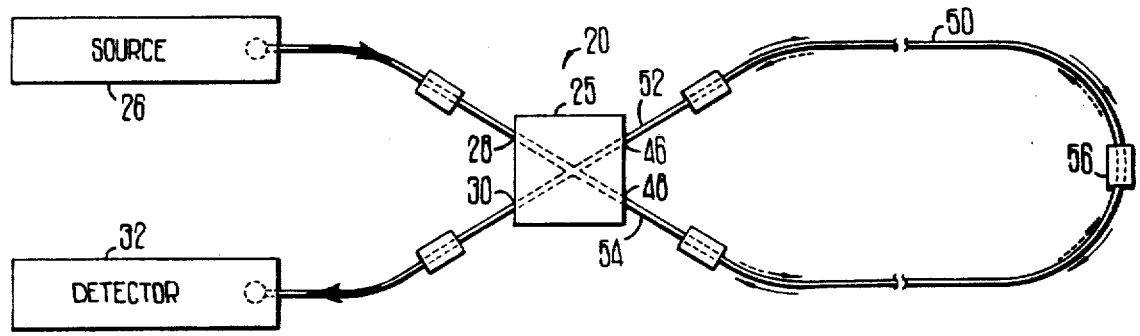

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 10-17, 23 is confirmed.

Claims 1-4 and 18-20 having been finally determined to be unpatentable, are cancelled.

Claims 5, 8, 9 and 21 are determined to be patentable as amended.

Claims 6, 7 and 22, dependent on an amended claim, are determined to be patentable.

5. [The] *An* optical fiber sensing system [of claim 1, wherein said optical fiber path comprises], *which comprises:*
  source means for providing successive optical signals;
  optical splitter means connected to said source means for splitting each successive optical signal into a set of two subsignals and for providing said subsignals as outputs, said splitter means also being effective to recombine each said set of subsignals after each said set of subsignals have traveled in opposite directions around a common path;
  an optical fiber path which begins and ends comprising optical fibers which are disposed in a cable, *said optical fiber path beginning and ending at said optical splitter means for receiving each said set of subsignals which have been split from an incoming signal from said source and which provides a common path for carrying said subsignals in opposite directions therealong and for returning said subsignals to said splitter means where they are recombined; and*
  detector means for detecting changes in an optical transmission characteristic between successive sets of subsignals which are returned to said splitter means.

8. [The] *An* optical fiber sensing system [of claim 1 which is used in a single mode transmission system and wherein said], *which comprises:*
  source means for providing successive optical signals;
  optical splitter means [comprises] *comprising* a fused biconic tapered splitter *and being connected to said source means for splitting each successive optical signal into a set of two subsignals and for providing said subsignals as outputs, said splitter means also being effective to recombine each said set of subsignals after each said set of subsignals have traveled in opposite directions around a common path;*
  *an optical fiber path which begins and ends at said optical splitter means for receiving each said set of subsignals which have been split from an incoming signal from said source and which provides a common path for carrying said subsignals in opposite directions therealong and for returning said subsignals to said splitter means where they are recombined; and*
  *detector means for detecting changes in an optical characteristic between successive sets of subsignals which are returned to said splitter means;*
  *said sensing system being used in a single mode transmission system.*

9. [The] *An* optical fiber sensing system [of claim 1 which is used in a multimode transmission system and wherein said], *which comprises:*
  source means for providing successive optical signals;
  optical splitter means [comprises] *comprising* a discrete element beam splitter *and being connected to said source means for splitting each successive optical signal into a set of two subsignals and for providing said subsignals as outputs, said splitter means also being effective to recombine each said set of subsignals after each said set of subsignals have traveled in opposite directions around a common path;*
  *an optical fiber path which begins and ends at said optical splitter means for receiving each said set of subsignals which have been split from an incoming signal from said source and which provides a common path for carrying said subsignals in opposite directions therealong and for returning said subsignals to said splitter means where they are recombined; and*
  *detector means for detecting changes in an optical characteristic between successive sets of subsignals which are returned to said splitter means;*
  *said sensing system being used in a multimode transmission system.*

21. [The] *A* method of [claim 18, wherein said step of directing includes] *sensing disturbances of an optical fiber system, said method comprising the steps of:*
  *providing a source of optical signals;*
  *splitting each optical signal into two subsignals;*
  directing the split subsignals [along] *in opposite directions around a common loop path and returning the two subsignals to entry points of said path, the common loop path comprising* optical fibers in a cable[, said optical fibers] being connected to provide the common path;
  *recombining the two subsignals after the two subsignals have moved about the common path and returned to the entry points; and*
  *detecting changes in the phase relationships as between successive pairs of the split subsignals to indicate a disturbance of the optical fiber system.*

* * * * *